June 10, 1941.                A. G. ZIMMERMAN                2,244,754
                        SOUND REPRODUCING MECHANISM
                            Filed June 28, 1938
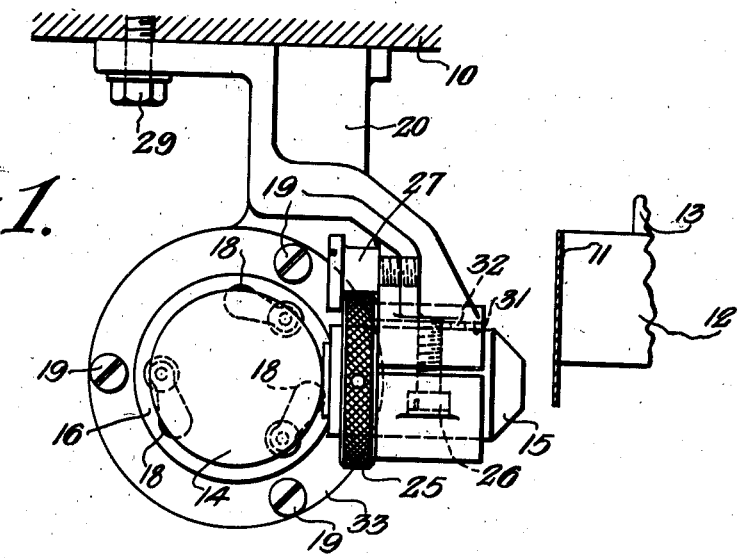
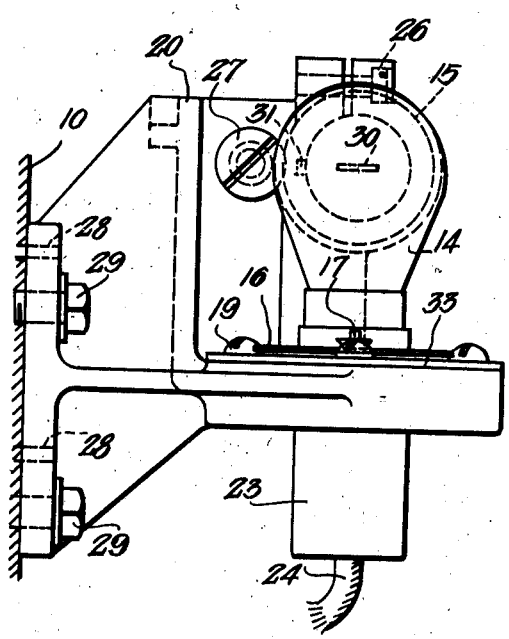
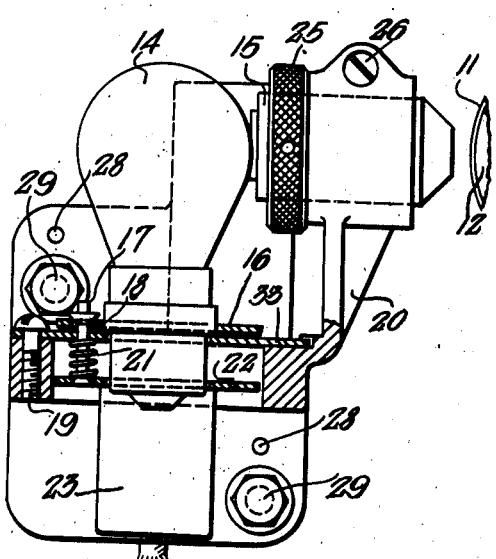
Arthur G. Zimmerman    Inventor
By
Attorney Patented June 10, 1941

2,244,754

UNITED STATES PATENT OFFICE 2,244,754

SOUND REPRODUCING MECHANISM

Arthur G. Zimmerman, Indianapolis, Ind., assignor to Radio Corporation of America, a corporation of Delaware Application June 28, 1938, Serial No. 216,299

5 Claims. (Cl. 88—24)

This invention relates to sound reproducing mechanism and more particularly to an improved bracket for supporting the exciter lamp and optical system in proper relation to the sound translation point of the film in such apparatus.

In many types of soundheads, it is customary to provide a mechanism built onto a center plate or equivalent vertical planar member, which mechanism carries a film drum on a shaft perpendicular to the plate and which supports an exciter lamp and an optical system in predetermined relation to the film drum so as to direct a fine line of light upon the film at the translation point. In prior art constructions the exciter lamps and optical systems have customarily been supported on separate brackets and these brackets were, therefore, necessarily separately aligned on the center plate with each other and with the film position. In such constructions difficulties have been encountered in properly locating the several elements in relation to each other as well as in proper relation to the film, and in the apparatus according to my invention these difficulties are obviated or minimized by providing a single bracket for supporting both the optical system and exciter lamp in predetermined relation to each other and to the base of the bracket. This permits location of the base of the bracket against the center plate, and thereby permits the alignment of both the exciter lamp and optical system with the proper point on the film to be accomplished in a single operation.

One object of the invention is to provide an improved exciter lamp support.

Another object of the invention is to provide an improved optical system support.

Another object of the invention is to provide a combined optical system and exciter lamp support.

Another object of the invention is to provide means which will rigidly support an optical system and exciter lamp in predetermined relation to each other.

Other and incidental objects of my invention will be apparent to those skilled in the art from a reading of the following specification and inspection of the accompanying drawing, in which—

Figure 1 is a top view of the apparatus showing the exciter lamp optical system and sound drum in proper relation to each other, Figure 2 is a side view of the apparatus taken from the bottom of Fig. 1, and Figure 3 is an end view of the apparatus taken from the left hand side of Fig. 1.

In the drawing, the center plate of the soundhead is indicated at 10. While the term center plate is used, as pointed out above, this may be a sub-assembly plate or equivalent member which establishes a plane accurately perpendicular to the shaft 13 which supports the sound record film 11 upon the drum 12 at the translation point. The film is, of course, carried past the translation point in front of the optical system either by being drawn over the drum, as shown and described in Loomis et al. Patent 2,019,147, or the drum may be positively driven, as described and claimed in Kellogg Reissue Patent 19,270. An exciter lamp 14 is provided, the light from which is directed through the optical system 15 to the film 11. This exciter lamp 14 is preferably mounted on a pre-focused base 16, which base is held in pre-determined position by the pins 17 held downwardly by the springs 21 acting against the ring 22. These spring-pressed members 17 hold the base 16 firmly against the plate 33 and, due to the conical shape of the heads of the members 17 which engage the apertures 18 in the pre-focused base, the lamp is precisely established in position in relation to the support. The member 33 is secured by screws 19 to the bracket 20, which consists of a unitary casting or die casting adapted to abut accurately against the center plate 10. The bracket 20 is established in position on the surface of the plate 10 by means of the alignment pins 28 which can be readily placed to a high degree of precision, and is secured to the plate by appropriate cap screws or bolts 29.

The optical system has a rectangular slit 30 to define the shape of the beam of light passing therethrough and is provided with a pin 32 fitted into the optical system barrel in predetermined relation to the aperture 30. This pin 32 slides in a keyway 31 machined in the bracket 20 in such a manner that the plane passing through the center of the keyway and the axis of the optical system is exactly perpendicular to the base of the bracket 20 and, therefore, is perpendicular to the center plate 10, thereby establishing the transverse line of light produced by the optical system 15 exactly in transverse position upon the sound-track of the film 11.

The optical system 15 is threaded on the outside at the left-hand end and upon these threads is fitted a knurled nut 25 for the purpose of focusing. This nut 25 bears, of course, against the corresponding portion of the bracket 20 for drawing the optical system away from the film and for forcing it toward the film it bears against the bottom of the head of the screw 27, thereby permitting axial adjustment of the optical system in either direction. When the optical system reaches adjusted position, it is clamped securely in position by means of the screw 26, which forces the circular portion of the bracket tightly around the optical system, clamping it firmly therein.

The exciter lamp 14 is preferably of the "single contact" type, contact with the bottom contact member thereof being made through an appropriate means of any desired type, the insulating housing of which is indicated at 23 and the wire at 24.

It will be apparent from the foregoing that I have provided a unitary bracket which secures the exciter lamp and optical system accurately in predetermined relation to each other and which thereby facilitates the accurate securing of both of them in predetermined relation to not only the position but to the direction of travel of the film in a sound reproducing apparatus.

Having now described my invention, I claim:

1. An optical system bracket for sound reproducing apparatus, comprising a single member having a planar base adapted to cooperate with a surface in said apparatus, a cylindrical aperture in said member having a keyway and adapted to cooperate with an optical system carrying a key, and means on said member for securing a pre-focused lamp in predetermined position relative to the optical system.

2. In apparatus of the class described, a bracket for supporting an exciter lamp and an optical system, said bracket having a plane surface adapted to cooperate with the surface of a supporting member, a second surface perpendicular to the first surface and adapted to support the exciter lamp, a portion of said bracket extending perpendicular to both of said surfaces and having an aperture therethrough for holding the optical system.

3. In apparatus of the class described, a bracket for supporting an exciter lamp and an optical system, said bracket consisting of a single casting having a plane surface adapted to cooperate with the surface of a supporting member, a second surface perpendicular to the first surface and adapted to support the exciter lamp, a portion of said bracket extending perpendicular to both of said surfaces and having an aperture therethrough for holding the optical system.

4. A bracket of the class described consisting of a single casting including a flat portion adapted to contact a supporting surface, an apertured shelf portion perpendicular to said flat portion for supporting an exciter lamp, and a portion perpendicular to both of the other portions and apertured to support an optical system.

5. A bracket of the class described consisting of a single casting including a flat portion adapted to contact a supporting surface, an apertured shelf portion perpendicular to said flat portion for supporting an exciter lamp, and a portion perpendicular to both of the other portions and including a cylindrical portion apertured to support an optical system.

ARTHUR G. ZIMMERMAN.